(12) United States Patent
Nielsen

(10) Patent No.: US 6,658,662 B1
(45) Date of Patent: Dec. 2, 2003

(54) RETRIEVING INFORMATION FROM A BROADCAST SIGNAL

(75) Inventor: Jakob Nielsen, Atherton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/885,801

(22) Filed: Jun. 30, 1997

(51) Int. Cl.[7] .............................................. H04N 7/173
(52) U.S. Cl. ........................ 725/109; 725/113; 725/37
(58) Field of Search .......................... 348/327, 10, 12, 348/13; 455/6.2, 6.3, 5.1, 4.2; 725/109, 110, 111, 112, 113, 37, 131, 134; H04N 7/16, 7/173

(56) References Cited

U.S. PATENT DOCUMENTS

| | | | |
|---|---|---|---|
| 5,262,860 A | * 11/1993 | Fitzpatrick et al. | 358/142 |
| 5,438,355 A | * 8/1995 | Palmer | 348/1 |
| 5,570,295 A | * 10/1996 | Isenberg et al. | 364/514 R |
| 5,761,606 A | * 6/1998 | Wolzien | 455/6.2 |
| 5,774,664 A | * 6/1998 | Hidary et al. | 395/200.48 |
| 5,774,666 A | * 6/1998 | Portuesi | 395/200.48 |
| 5,818,441 A | * 10/1998 | Throckmorton et al. | 345/328 |
| 5,818,935 A | * 10/1998 | Maa | 380/20 |
| 5,832,223 A | * 11/1998 | Hara et al. | 395/200.47 |

OTHER PUBLICATIONS

"Joining Television and the Internet Using Java", Author unknown, Internet Week V.2 No. 14, Apr. 1996.*

* cited by examiner

Primary Examiner—Chris Grant
(74) Attorney, Agent, or Firm—Finnegan, Henderson, Farabow, Garrett & Dunner, L.L.P.

(57) ABSTRACT

A broadcast video signal is captured on user command and processed to identify network addresses contain therein. Network addresses are stored together with information about the program during which they originated. Identified network addresses are accessed over the network to validate their correctness and a snapshot of the page displayed is stored and related to the network address. An HTML file is constructed showing the original image from which the HTML file was constructed, the address(es) extracted from the original image as hypertext lines and snapshots of the corresponding images. By viewing the HTML file, a user can quickly determine if he wishes to retrieve information from the network addresses and can do so by clicking in the hypertext links.

2 Claims, 7 Drawing Sheets

RETRIEVING INFORMATION FROM A BROADCAST SIGNAL

BACKGROUND OF THE INVENTION

1. Field of the Invention

The present invention relates generally to computer systems, and more particularly relates to capturing information from a broadcast signal for later use of the information in a computer system to locate resources in a network.

2. Description of Related Art

In real-time broadcast media that present transitory information, such as television, references to other information or media have become commonplace. For example, television advertisers often include contact information such as a business address or telephone number in a television advertisement so that viewers of the advertisement can locate the business after the advertisement has disappeared from the screen.

As another example, due in part to the explosive growth of the globally accessible computer network known as the Internet, it has become commonplace for advertisers and other users of broadcast media to include an Internet address in broadcast advertisements.

One popular technology enjoying wide use with the Internet is known as the World Wide Web. The World Wide Web enables a computer to locate a remote server using a server name in an agreed-upon format that is indexed at a central Domain Name Server (DNS); the computer can then retrieve information using a communication protocol called the Hypertext Transfer Protocol (HTTP). A Uniform Resource Locator (URL) uniquely identifies each page of information stored on the remote server. A URL is a form of network address that identifies the location of information stored in a network. The pages of information are files prepared in the Hypertext Markup Language (HTML).

As use of the World Wide Web has soared, advertisers have also begun to include URLs in broadcast advertisements so that users often see URLs while they are watching television or other broadcasts. The URLs typically identify a Web server or pages on a Web server that contain information about the products that are advertised. For example, a URL may be listed in a commercial or it may be shown on the screen as part of a show. Typically this is done in news broadcasts or documentaries, though many entertainment shows also have websites that are listed at some time during the broadcast.

THE PROBLEMS

However, it is typically difficult for a person exposed to a broadcast or advertisement to make a note of the URL for later use. The URL generally appears in the broadcast advertisement only for a brief moment, for example, in the form of a spoken series of words in a radio advertisement, or a text string flashed on a television screen at the conclusion of a TV ad. Also, some URLs are quite long and need to be spelled with 100% accuracy to be useful. They include unusual typed characters such as colons, slashes and "~" characters. These characters and other parts of the URL must be remembered and reproduced correctly, or the URL cannot be used successfully to retrieve a Web page.

In addition, even if the person exposed to the advertisement successfully records a URL, for example, by writing it down, it must be manually keyed into a computer system in order to access the associated Web page. Also, not all URLs have any secondary or mnemonic meaning; therefore, if any significant time delay passes between recordation of the URL by the person and use of the URL, the person may forget what advertiser or product the URL is associated with.

For all these reasons, there is a need for methods, apparatus and products that can retrieve information from a broadcast signal in an automated way.

In particular, there is a need for methods, apparatus, and products that enable a person exposed to the broadcast signal to retrieve information referenced in the broadcast signal conveniently and without error.

There also is a need for methods, apparatus, and products that enable a person to store the information that is retrieved in association with information about the broadcast signal.

There is also a need for a way to identify a network address from within a broadcast signal and store the network address in association with an image from the broadcast signal.

SUMMARY OF THE INVENTION

The invention provides a method, apparatus, and computer program product for capturing information from a video signal. In one approach, a method comprises the steps of storing an image from the video signal; identifying a network address contained in the image; and storing the network address for later retrieval. In one aspect, the network address is stored with a copy of the image. In another, the network address is used to access information stored in a network at the network address.

In another aspect, a method includes the steps of converting an image into a first image file; identifying a text item in the first image file; parsing the text item into a network address; and storing the network address with information identifying the video signal. In an alternate embodiment, the invention includes the steps of sending the image to a frame grabber, and converting the image file using the frame grabber. Another feature of the invention is sending the first image file to an optical character recognition (OCR) processor, and identifying a text item in the first image file using the OCR processor.

In another aspect, the invention includes the step of parsing the text file into at least one URL. In yet another aspect, the invention includes the step of checking whether a string of characters is a valid URL. The checking step is carried out by connecting to a computer network; requesting information from a location in the computer network that is identified by the string; and testing whether the step of requesting information is successful.

The invention also encompasses a computer system and a computer software product configured with the foregoing features and aspects.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, through not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

A method, apparatus and computer program product for retrieving information from a broadcast signal is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
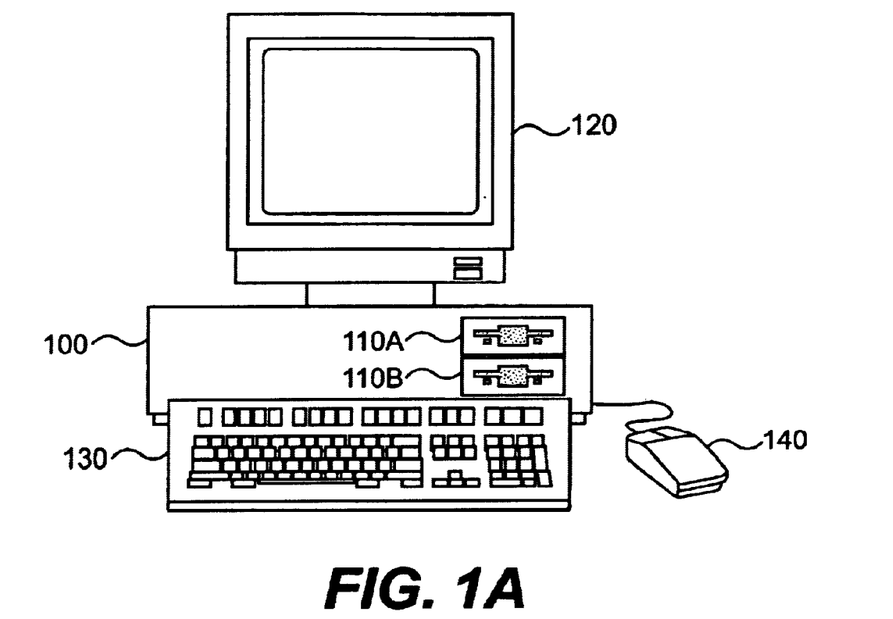
FIG. 1A illustrates a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has a display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
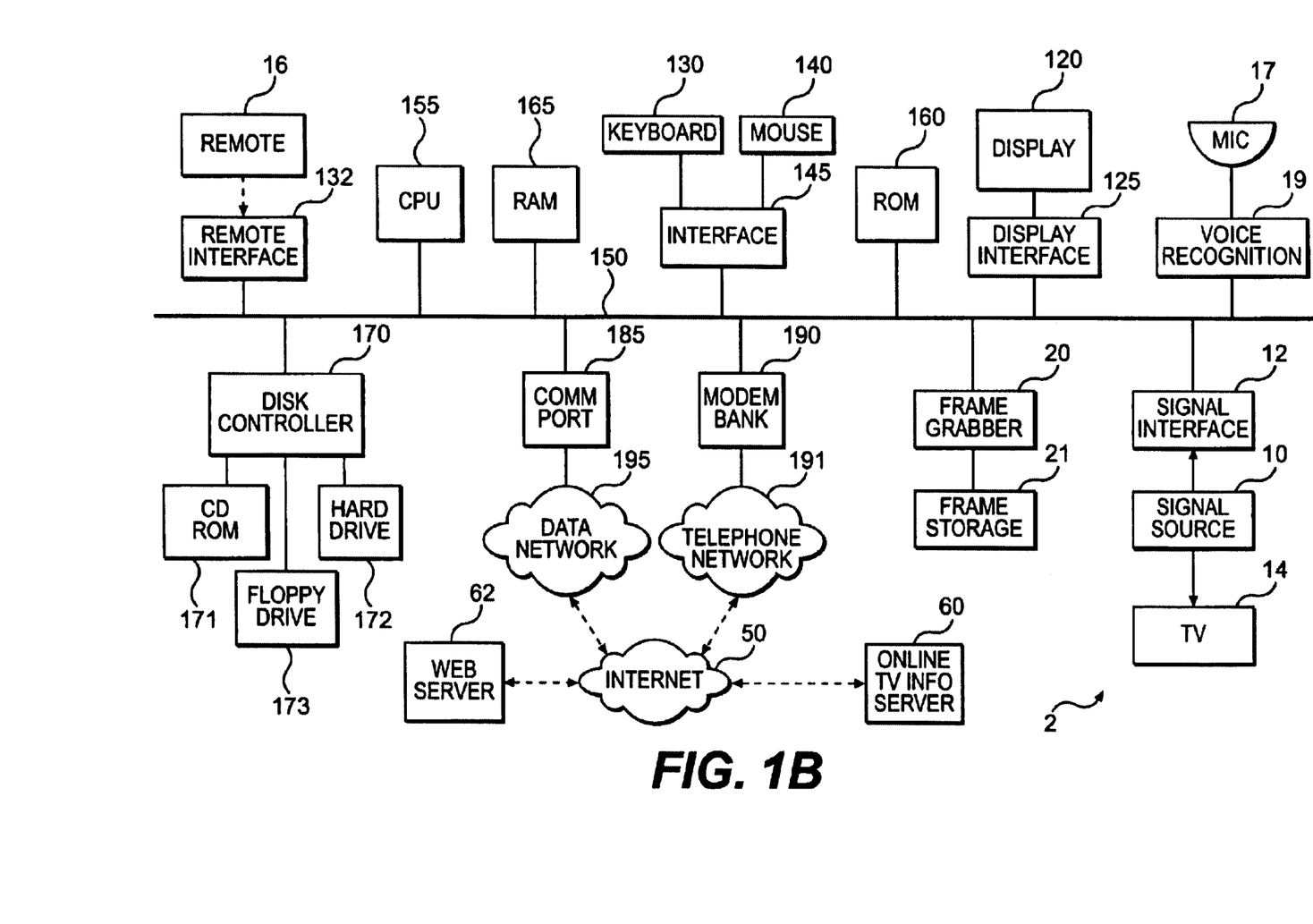
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disk) drives such as 171. A display interface 125 interfaces a display 120 and permits information from the bus to be viewed on the display. A modem bank interface 190 is used if the computer is configured as a proxy or an Internet Service Provider (ISP). The modems of the modem bank 190 are connected to a telephone network 191 in the usual manner. Communications with a network 195 or with other external devices can occur over communications port 185.

In one embodiment, the data network 195 is coupled to a globally accessible computer network such as the Internet 50. Alternatively, the network 195 is a local area network. For example, using a modem bank 190 and telecommunications software, the computer can call a local Internet Service Provider (ISP) and establish a dial-up connection to the Internet 50. A remote Web server 62 is connected to the network. The remote server 62 contains pages or websites referenced in a signal provided from the signal source 10.

Figure 1C:
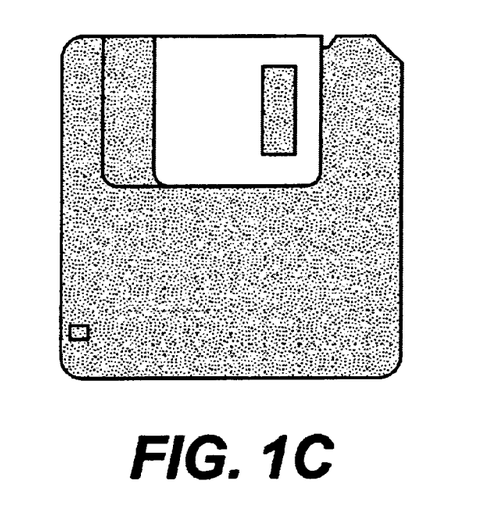
FIG. 1C illustrates an exemplary memory medium containing one or more programs usable with the computer of FIG. 1A.

FIG. 1C illustrates an exemplary memory medium which can be used with drives such as 173 in FIG. 1B or 110A in FIG. 1A. Typically, memory media such as a floppy disk, CD ROM, or Digital Video Disk will contain program information for controlling the computer to enable the computer to perform its functions in accordance with the invention.

FIG. 1A also illustrates one embodiment of an apparatus for capturing information from broadcast signals according to the invention.

An information capturing system 2 comprises a signal source 10 coupled to a signal interface 12 that is coupled to the bus 150. The signal source 10 provides a broadcast signal that contains information to be captured. For example, the signal source can be a television antenna, a cable television cable, a satellite dish, or a radio antenna. The signal interface 12 converts a broadcast signal received from the signal source 10 into a digital form that is usable by the CPU 155. The internal configuration of the signal interface 12 is dependent on the nature of the signal source 10. For example, if the signal source 10 is a television antenna, then the signal interface 12 comprises a channel tuner, an amplifier, and a video digitizer.

The signal interface 12 may be integrated into a computer system in the form of a single device that has computational capabilities and the ability to receive, store and display an external analog signal such as a video signal. For example, the MacTV device available from Apple Computer, Inc., and the WebTV device developed by WebTV Networks, Inc. and available from Sony, have components that are suitable. Also, the CPU 155 and other hardware elements of FIG. 1B may be remote from the signal interface 12 and connected to it by a cable or by wireless means.

Figure 2:
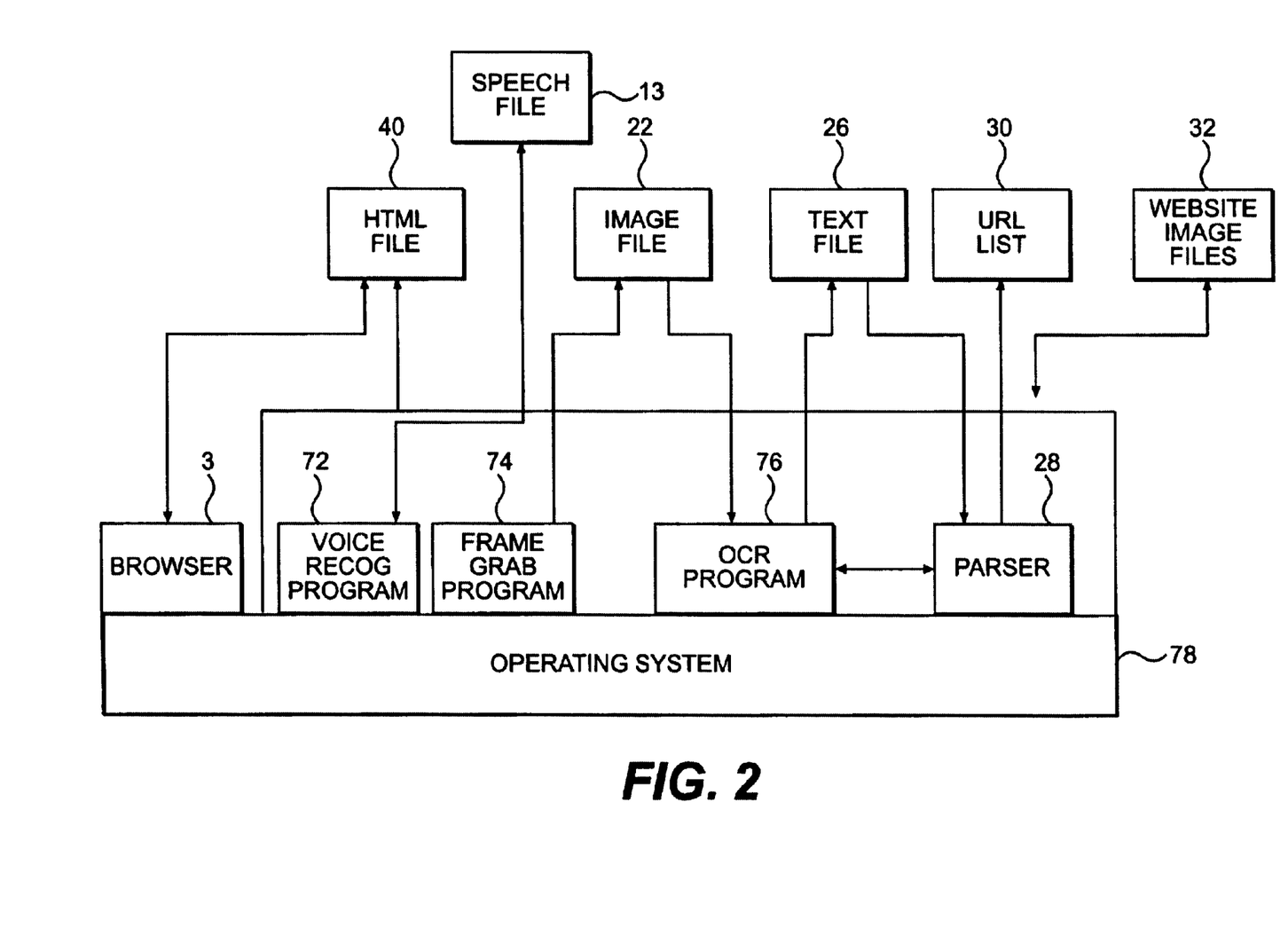
FIG. 2 is a block diagram of one embodiment of a software architecture apparatus for capturing information from broadcast signals according to the invention.

As shown in FIG. 2, a World Wide Web browser 3 runs on the system 2, for example, by residing in the main memory (160, 165) or in the data storage devices 171, 172, 173 that are described herein. The browser 3 is any program or device that is capable of interpreting documents prepared in HTML and commanding the system 2 to display the document as interpreted. An exemplary browser 3 is the HotJava browser available from Sun Microsystems, Inc. The browser 3 is used to establish a connection using the HTTP protocol to a remote Web server computer 62. The Web server computer 62 runs a Web server program that uses the HTTP protocol to respond to the browser 3. The Web server computer 62 has a storage device that stores documents such as HTML format documents or Web pages.

A remote signaling device, such as a remote control 16, is coupled to the bus 150 through a remote interface 132. The remote control 16 is preferably coupled to the interface 132 by wireless means, such as an infrared LED at the remote control 16 that signals to an infrared detector at the interface 132. In an alternative embodiment, the remote signaling device is a microphone 17 that is coupled to a voice recognition processor 19 which is coupled to the bus 150. A user speaks into the microphone 17, and the spoken sounds are digitized by the voice recognition processor 19 and provided to the system 2. The remote signaling device may comprise any other means that signals the computer to grab a frame from the signal source 10 and identify information in it, such as network address or a URL.

The bus 150 is also coupled to a frame grabber 20. The frame grabber 20 receives an analog broadcast signal, such as a television signal from the signal interface 12. The frame grabber 20 has a high-speed analog-to-digital converter that makes a digitized copy of a single frame of the television signal. Television signals adhering to the NTSC standard widely used in North America are transmitted at sixty interleaved frames per second; each interleaved frame contains video information to energize one-half of the scan lines of a standard television receiver. In this patent document, the term "frame" refers to the smallest complete image that can be displayed at an instant in time, such as a pair of interleaved NTSC frames. Because a television signal changes rapidly in real time, the process of capturing and saving a single frame is known as "grabbing" a frame off the air. The frame grabber 20 saves the grabbed frame, for example, by writing it to a local memory in the frame grabber 20. In one embodiment, the grabbed frame is written to an image file 22 that is coupled to program elements of the system 2 shown in FIG. 2.

In an alternate embodiment, a frame storage 21 is coupled to the frame grabber 20 and to the signal interface 12. The frame storage 21 contains a large, fast local electronic memory that can receive in real time and store a large number of frames. Frames in the frame storage 21 are organized in first-in, first-out manner. The frame storage 21 provides a way to store frames that disappear from the television screen before a user has a chance to signal the system 2 using the remote signaling device to capture information in a frame. The system 2 can retrieve a frame from the frame storage 21 that was displayed earlier in time. For example, the frame storage 21 is configured to store the 150 most recently viewed frames, providing a five-second period (at thirty frames per second) in which the user can react to the video signal and signal the system 2 to capture information from a frame. When the remote signaling device is activated, the frame storage 21 provides its first frame, i.e., the oldest of the 150 frames, to the frame grabber 20.

An optical character recognition (OCR) processor 24 is coupled to the bus 150. Under control of the OCR program 76 shown in FIG. 2, the OCR processor 24 can scan a digital image file and identify human-readable typographical characters within the image file 22. When characters are recognized in the image file 22, the characters are written to a text file 26 that is readable and writable by the CPU 150.

Due to known limitations in the art of OCR processing, it is possible that the OCR processor 24 or OCR program 76 may output several alternative interpretations of data in the image file 22, in the form of a plurality of text strings. Some known OCR processors pass such alternative text strings to a natural language parser that applies natural language rules to the alternative text strings in an effort to determine the best natural language interpretation of the text strings. In the invention, all the text strings are written to the text file 26. A parser program 28 runs on the computer system. The parser 28 is configured to read the text file 26, to identify strings of characters or words in the text file 26 that represent references to other information, and to write the words in a text file such as the URL list 30.

In one embodiment, the parser 28 is configured to identify a network address, such as a URL that represents a reference to a remote World Wide Web server 62, known as a website. URLs generally are formatted according to the following template:

<protocol id>://{<server>}<second level domain><top level domain>{<directory>}{<file>}

The <protocol id> identifies the transmission protocol to be used. For example, in the case of the Web it is <http>, and in the case of an anonymous file transfer protocol transaction it is <ftp>. The <server> element is an optional server name such as <www.>. The <server> element may also identify a directory on a storage device of the Web server 62 that contains HTML documents. The <second level domain> element is the name of the server domain as found in the DNS table, such as <sun>. The <top level domain> element identifies the type of the second level domain, and must be an item selected from a finite set of globally recognized top level domains, such as "comr," "org," "mil," "edu," "gov," and others. The <directory> element is an optional name of a directory within the <server>, such as <DocumentRoot/>. The <file> element is an optional name of a file, document or image to be retrieved, such as <Index.html>. Thus, a URL serves as one type of a network address to locate a document anywhere in a network.

The parser 28 is preferably configured to locate and identify URLs that strictly meet this convention, such as http://www.sun.com/, or canonical Website domain names, such as www.sun.com. Canonical website domain names are commonly used in broadcast signals as shorthand for a URL, because the syntactically correct string prefix <http://> can be inferred from the use of <www> as a server name. Accordingly, the templates available to the parser 28 include templates for all commonly used shorthand URL formats. When a canonical Website domain name is identified, the system 2 converts the canonical Website domain name into a complete, syntactically correct URL.

Thus, in one embodiment, the system 2 is used by a user who is watching television on a device that also has computational capabilities and is connected to the Internet.

FIG. 2 is a block diagram of a software architecture with which an embodiment of the present invention can be implemented.

An operating system (OS) 78 is installed in the central processing unit 100, such as on the hard drive 172. In conventional manner, the OS 78 is loaded by the CPU 155 into the main memory when the computer is powered up. The OS 78 controls and supervises the operation of one or more application software programs, and facilitates interaction of the application programs with functions of the operating system 78 and of the computer hardware. The browser 3 is one of the application programs.

In one embodiment of the invention, a control program 70 coordinates operation of the hardware and other software elements. In the embodiment that uses voice command to trigger retrieval of information from frames, a voice recognition program 72 runs on top of OS 78 under control of the control program 70. The voice recognition program 72 controls the voice recognition processor 19 to receive an analog voice signal from the microphone 17. The voice recognition program 72 writes the analog voice signal, in known manner, to one or more speech files 13, and carries out conversion of the analog voice signal to digital form.

A frame grab program 74, OCR program 76, and parser 28 each run under control of the OS 78 and the control program 70. As described below, the frame grab program 74 writes frames to an image file 22. The OCR program 76 reads the image file 22 and writes strings of text recognized in the image file 22 to a text file 26. The parser 28 reads the text file 26. The parser 28 reads the text file 26 and writes network addresses, such as URLs, that are recognized in the text file to a URL List file 30. The control program 70 reads and writes website image files 32.

The website image file 32 and image file 22 are saved on the data storage devices 172, 173 in a standard graphic image format, such as JPEG or GIF. The text file 26, URL list 30, and HTML file 40 are conventional text files.

The image file 22, text file 26, URL list 30, and HTML file 40 may be stored in the data storage device 107.

The present invention is related to the use of system 2 to retrieve information from a broadcast signal. According to one embodiment, retrieval of information from a broadcast signal is performed by system 2 in response to CPU 155 executing sequences of instructions contained in memory 160, 165. Such instructions may be read into the memory from another computer-readable medium, such as data storage devices 171, 172, 173. Execution of the sequences of instructions contained in the memory causes CPU 155 to perform the process steps that will be described hereafter. In alternative embodiments, hard-wired circuitry may be used in place of or in combination with software instructions to implement the present invention. Thus, the present invention is not limited to any specific combination of hardware circuitry and software.

This combination of elements provides a way to capture information from a broadcast signal in an automated way.

In one embodiment, the system 2 is operated when a user is watching a broadcast television program carried from the signal source 10 to the television receiver 14. The television program is concurrently carried to the bus 150 through the signal interface 12 so that a user can watch television on the television receiver 14 while the system 2 is in operation. During an advertisement or other portion of the broadcast television program, a URL is included in an image that is broadcast. The user wishes to view a website at the remote server 62 that is identified by the URL at some future time. Accordingly, the user activates the remote control 16 to indicate a desire to grab a URL currently displayed on the television screen.

In response, under control of the control program 70 the system 2 sends the current video frame to a frame grabber 20 that converts the current video frame into an image file. In one embodiment, system 2 commands the frame grabber 20 to grab the frame currently contained within the broadcast television signal. The frame grabber 20 digitizes a copy of the current frame and writes the frame to the image file 22. The frame grabber 20 reports to the system 2 that a frame has been successfully grabbed.

Using the OCR program 76, the system 2 then commands the OCR processor 24 to read the grabbed frame from the image file 22 and to identify any text information that is found within the image file 22. In response, the OCR processor 24 and OCR program 76 read the image file and, using conventional optical character recognition techniques, locate any text information that is in the frame. The OCR program 76 may use a probabilistic algorithm to "guess" at the most likely text information found in the image file 22. As a result, the OCR program 76 may output more than one set of text information or text string. If text is successfully located, it is passed to the control program 70 and written by the control program 70 in the text file 26. If the OCR processor 24 locates multiple strings of text, or determines that a particular portion of the image file 22 may be interpreted as several different strings of text, all the alternate representations or text strings are written to the text file 26.

The control program 70 commands the parser 28 to prepare a list of URLs from the text file 26. The parser 28 reads the text file 26 and examines each text item within the text file 26. The parser 28 identifies text in the form of a valid URL or in the form of a canonical Web server domain name. Recognized text is reformatted into one or more syntactically valid URLs that are written to a URL list 30. Parsing can be carried out, for example, by scanning the text file, compiling character strings into word strings, testing the word strings against a vocabulary of valid items or against templates of valid URL semantics, and building in memory a list of valid items. As an example, a word string can be tested against the URL template described above. Another way to carry out the parsing step is to scan the text file for a valid top level domain identifier, such as ".com," and then scan the text immediately preceding and following the domain identifier to determine whether it can be combined with the domain identifier to form a valid URL.

URL parsing techniques are known in the art. For example, the Eudora electronic mail software program commercially available from Qualcomm, Inc. can scan an email message and recognize text that is in the form of a valid URL.

Upon completion of the parsing operation, the system 2 reads each URL in the URL list 30 and attempts to connect to the website identified in the URL through the Internet 50. This is done by issuing the HTTP GET command, with the URL as an argument. If the domain name of the server included in the URL is not listed in the DNS, or if no server at the URL responds within a pre-determined timeout period (such as 30 seconds), an error condition is raised and the URL is deleted from the URL list 30.

If the HTTP GET command is successful, the home page or initial page of the website identified by the URL is retrieved to a cache memory of the system 2. Preferably the home page is retrieved in complete form by following all hyperlinks to embedded images in the page and retrieving all graphic images and other non-textual information that is referenced in the page. The system 2 then constructs a website image file 32 by making a bitmapped, scaled-down representation of the complete home page. In the preferred embodiment, the system 2 carries out the step of constructing the image file 32 while the user is engaged in another activity, such as watching television. Use of the website image files 32 is described below. The home pages in the cache are retained in cache memory or, alternatively, written to the data storage devices 172, 173 for later retrieval.

The step of testing the URLs identified by the system 2 against live websites available through the World Wide Web effectively operates as an additional validity check on the URLs. In this way, use of the OCR and parsing processors is significantly improved.

Figure 3:
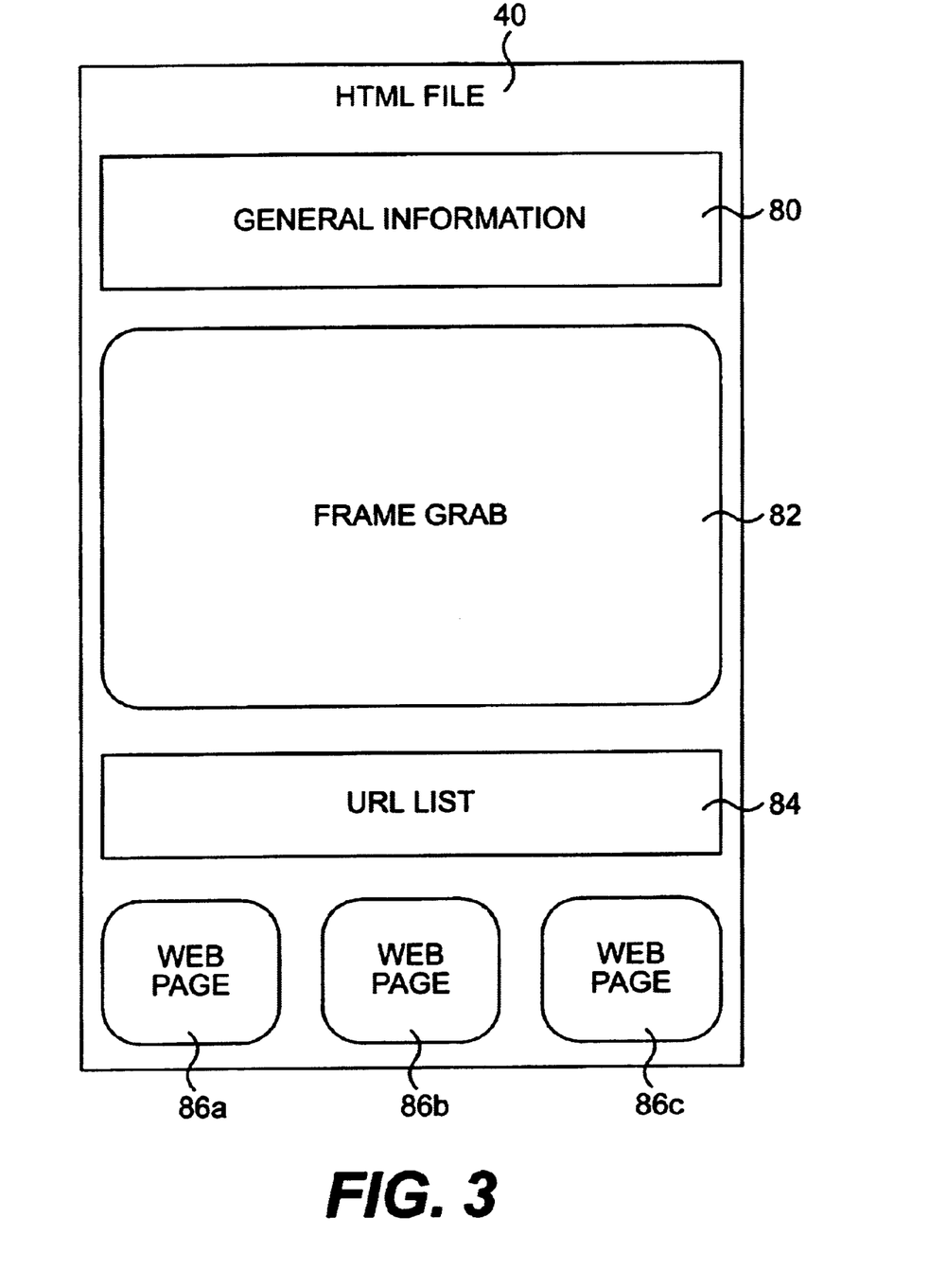
FIG. 3 is a block diagram of a file that is created by one embodiment of the invention.

The system 2 then constructs an HTML file 40 having the structure shown in FIG. 3. The HTML format is used for the HTML file 40 so that the user can later retrieve the HTML file 40 using the browser 3 and conveniently visit a website identified in a URL captured from the video signal. Generally, the HTML file 40 contains: information about the signal that the user was watching when a frame grab was requested; a representation of the current frame; and the URL or URLs located by the OCR processor and the parser in the frame. In the embodiment shown in FIG. 3, the HTML file 40 contains a block of general information 80, a frame grab 82, a URL list 84, and a plurality of Web pages 86a, 86b, 86c. The general information 80 comprises the current date and current time at which the frame grab occurred, and the channel or frequency that the user was watching when the frame grab occurred.

In an alternate embodiment, while building the HTML file 40, the system 2 connects to an online TV information server 60 using the Internet 50. The online TV information server 60 has a searchable database of program information that can be retrieved by channel, date, and time. It provides an automated way to obtain information about any TV program broadcast at any time on any channel in any broadcast market. The system 2 provides the date, time, and channel of the current frame to the online TV information server 60, and requests the online TV information server 60 to provide any information available in the database about the identified program. The information from the database is displayed as part of the general information 80.

The frame grab 82 of the HTML file 40 is a reproduction of the frame grabbed by the frame grabber 20. In one embodiment, the frame grab 82 is a hyperlink to a copy of the image file 22. Thus, when a Web browser program is interpreting the HTML file 40, the browser follows the frame grab 82 hyperlink, reads the image file 22 at the location identified by the hyperlink, and displays the image file 22 within the Web page defined by the HTML file 40. In another embodiment, the frame grab 82 is a hyperlink to a copy of the image file 22 that is reduced in size from the original by one half, and the frame grab 82 is an active graphic associated with a hyperlink to a full size copy of the image file 22. The reduced size image file loads far more quickly when the browser displays the reduced size image file; however, the user can click on the frame grab 82 and the browser will then display the full size copy of the image file 22.

Preferably, to save storage space, the full-sized copy of the image file 22 is deleted from the data storage device 107 after seven days of storage, and the reduced size copy is deleted after fourteen days.

The frame grab 82 is included in the HTML file 40 in order to increase the probability that the user will remember why he or she decided to capture a URL from that image. In this way, when a user displays the HTML file 40 after a significant time has passed, the user will recall that URLs shown in the HTML file 40 are associated with a particular program, product or advertiser.

The URL list 84 is a text listing of each URL identified by the parser 28. Each URL is formatted as a hypertext link before it is inserted into the HTML file 40. In this way, when a browser displays the HTML file 40, a user can click on any of the URLs and connect to the website identified by the URL.

The HTML file 40 also has a plurality of hypertext links which, when followed by the browser 3, cause the browser 3 to display Web page images 86a, 86b, 86c. Each of the Web page images 86a, 86b, 86c is a display of one of the website image files 32 constructed by the system 2. As described above, each website image file 32 is constructed by the system by making a bitmapped representation of a page of a website identified by a URL captured from the video signal and stored in a cache memory of the system 2. In a preferred embodiment, the Web page images 86a, 86b, 86c and their associated website image files 32 are scaled-down representations of the associated website pages. For example, the Web page images 86a, 86b, 86c may represent a website page reduced by 50% from its standard display size. Each of the Web page images 86a, 86b, 86c represents a different URL that was captured from the video signal. Three Web page images 86a, 86b, 86c are shown in FIG. 3, but any number of links to Web page images can be stored in the HTML file 40. For example, if the parser 28 outputs only one URL for a frame grabbed from the video signal, then only one Web page image 86a is displayed as part of the HTML file 40.

In one embodiment, each of the Web page images 86a, 86b, 86c is stored as an active graphic in the HTML file 40. Active graphic images are associated with a hypertext link. When the browser 3 displays an active graphic, and a user clicks on the active graphic, the browser 3 retrieves the Web page identified by the hypertext link. Each of the Web page images 86a, 86b, 86c is associated in the HTML file 40 with a hypertext link to the website represented by that Web page image, such as a URL captured from the video signal. When the HTML file 40 is displayed to the user in the form shown in FIG. 3, the user can click on one of the Web page images 86a, 86b, 86c . In response the browser 3 will follow the associated hypertext link to the website represented by the selected Web page image.

Thus, the Web page images 86a, 86b, 86c provide a way for a user to mentally associate a visual representation of a Web page with the URLs recognized from the video signal, and with a frame of the video signal. Also, the user can rapidly display the website associated with the video signal simply by clicking on its representation that is displayed as part of the HTML file 40.

In an alternate embodiment, in addition to or in place of the remote control 16, the system 2 includes a microphone coupled to a speech recognition processor 19. The speech recognition processor is coupled to the bus 150 and operates under control of a voice recognition program 72. The user can command the system 2 to capture information from a signal arriving from the signal source 10 by stating the command to the system 2. For example, when a desired URL appears on a TV program, the user says "SAVE WEBSITE" to the microphone. The microphone 17 converts the spoken command to an audio signal that is provided to the voice recognition processor 19. The voice recognition processor 19 and voice recognition program 72 scan the audio signal to recognize spoken words, and write a speech file 13 of recognized words to one of the data storage devices 172, 173. The voice recognition processor 19 then commands the system 2 to read the speech file 13, e.g., by an interrupt. In response, the system 2 reads the speech file 13 and responds to the command in the manner described above with respect to the remote control 16.

Figure 4A:
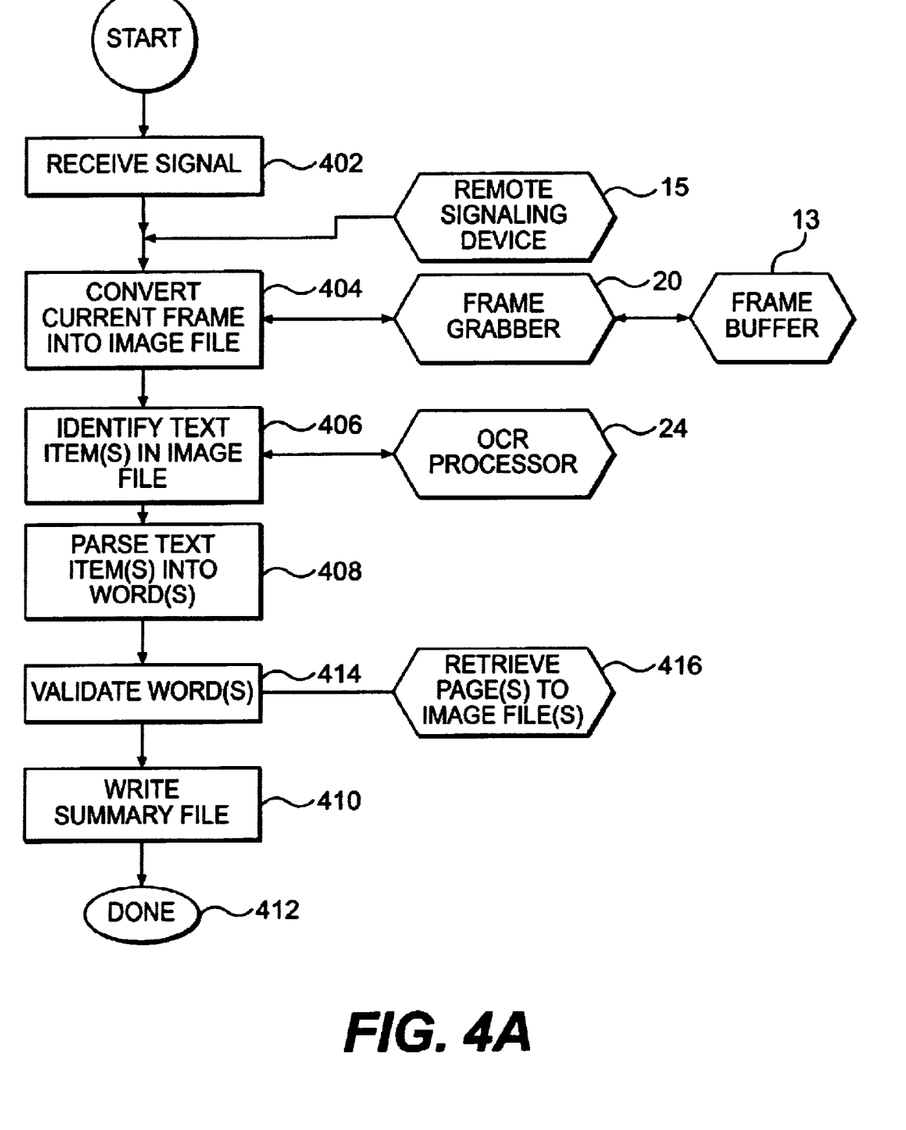
FIG. 4A is a flowchart of a method according to one embodiment of the invention.

The invention also encompasses a method of capturing information from a signal. FIG. 4A is a flowchart of one embodiment of a method according to the invention.

In step 402, a signal is received, for example, by receiving a broadcast video signal to a memory continuously in real time. Using a remote signaling device, such as the remote control 16 shown in FIG. 1B, a user signals that information in a current frame of the video signal is to be captured. In response, in step 404 the current frame is converted into an image file. The conversion step can be carried out by digitizing a frame retrieved from a frame buffer 17 that receives the video signal in real time. Alternatively, a frame grabber 20 without a frame buffer can grab a frame from the video signal, digitize the grabbed frame, and write a digital image file representing the grabbed frame.

When a frame has been grabbed, in step 406 any text items in the image file are identified. The identification step 406 can be carried out using an OCR processor 24 that reads the image file and writes a text file containing any text strings or characters identified in the image file.

When the text file has been written, in step 408 the text file is parsed to identify any references to other information, for example, by identifying URLs or domain names in the text file. The parsing step 408 can be carried out by scanning the text file, compiling character strings into words, testing the words against a vocabulary of valid items or against a template of valid URL semantics, and building in memory a list of valid items. For example, the parsing step 408 can be carried out in the manner described above with respect to the parser 28. Valid words or URLs identified in the parsing step 408 are written to a list of words or URLs.

The words identified in the parsing step 408 are further validated in step 414. In one embodiment, the validation step 414 is the step of checking that each word or URL represents a valid website.

Figure 4B:
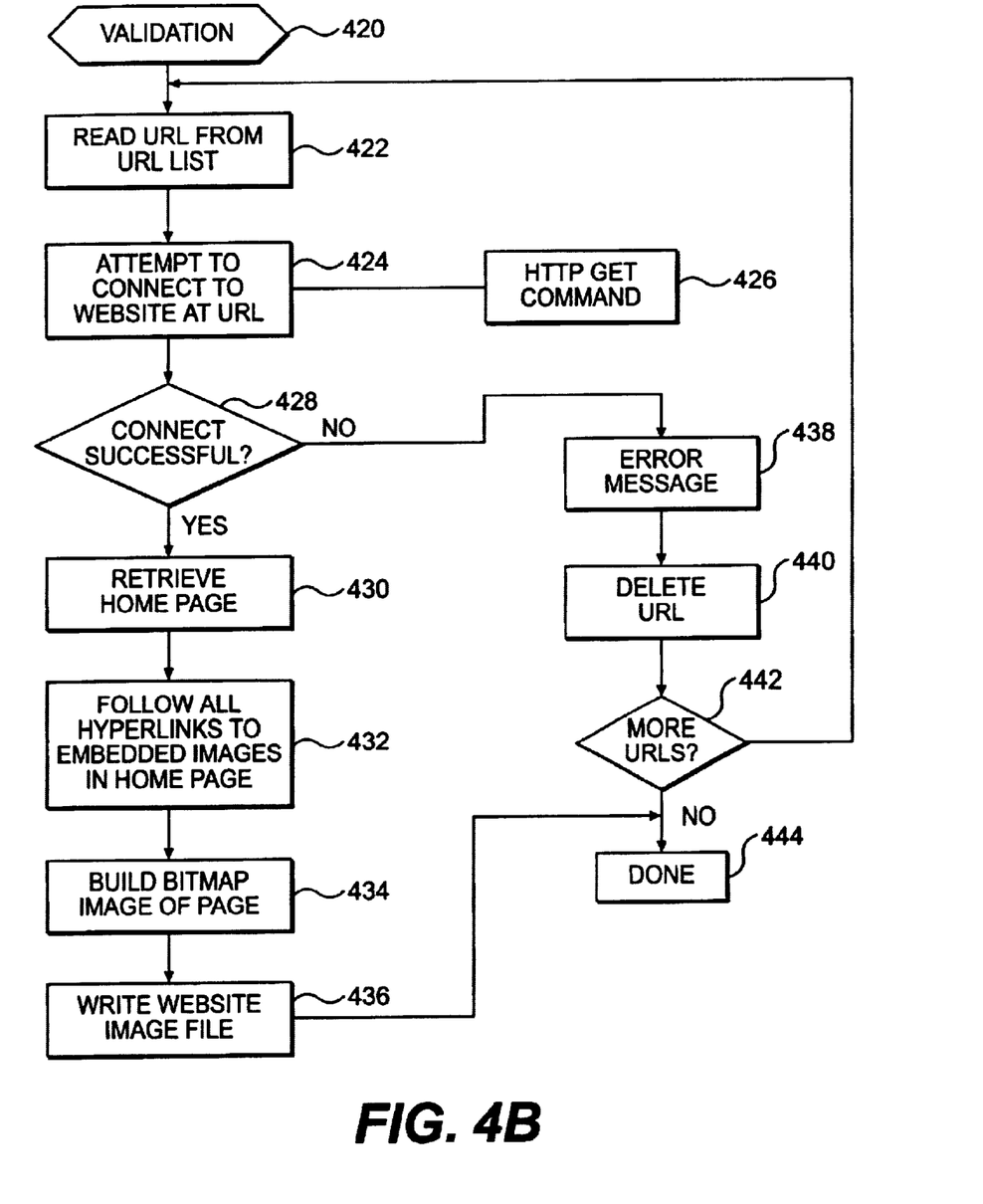
FIG. 4B is a flowchart of a method of validating URLs as part of one embodiment of the invention.

FIG. 4B is a flow chart of one embodiment of a method for carrying out the validation step.

In step 422, a URL is read from the URL list. In step 424, the system attempts to connect to a Web server at that URL, for example, by opening an HTTP connection and issuing the HTTP GET command with the selected URL as an argument as shown in step 426.

In step 428 the system tests whether the connection was successful. If no website responds, or if the retrieval attempt generates an HTTP error, then in step 428 the system 2 generates an error message and displays it on the display device. Also, in step 440 the requested URL is deleted from the URL list. Next, in step 442 the system tests whether the URL list contains more URLs. If so, control is passed to step 422 and the process is repeated for the next URL.

If a page is successfully retrieved from the website, in step 416 the page is stored in a cache memory of the system 2, and a graphic representation of the page is written to a website image file 32. This may involve steps 430 to 436 of FIG. 4B. In step 430, the home page of the website identified by the selected URL is retrieved, and a local copy of its HTML code is stored. In step 432, the system follows all hyperlinks in the home page that lead to embedded graphic images. Each image is retrieved and stored locally. When all images are retrieved, the complete page is displayed on the display device. A bitmap image of the complete page is constructed in memory, as shown in step 434. In step 436, the bitmap image is written to a website image file in a standard format.

When the validation step 414 is complete, in step 410 a summary file is written. As an example, the summary file is an HTML file, and may have the exemplary format shown in FIG. 3. The summary file contains information about the video signal from which the frame was grabbed, a representation of the frame that was grabbed, and a list of the URLs that were found in the frame. Alternatively, the summary file may also contain a representation of a home page of each website identified by an URL in the list of URLs.

Figure 4C:
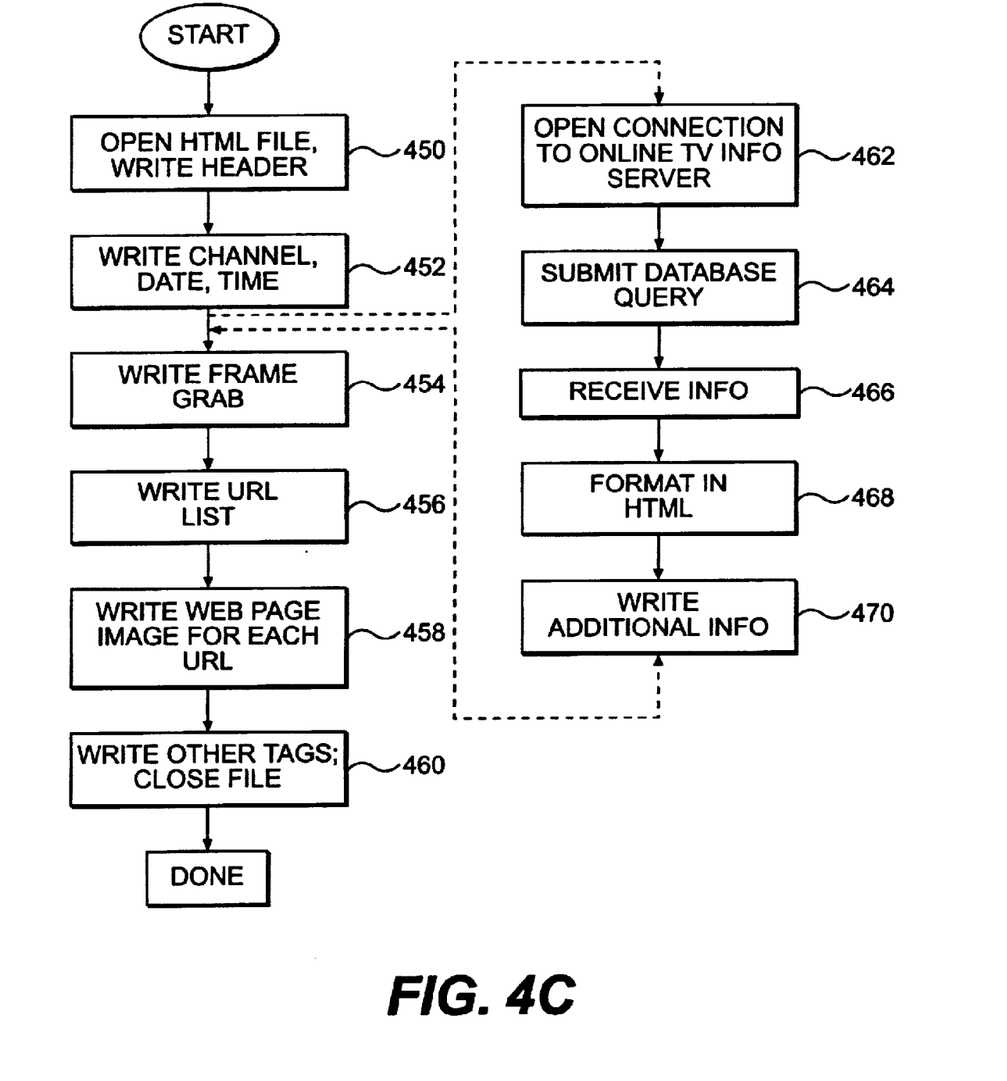
FIG. 4C is a flowchart of a method of writing an information summary file as part of one embodiment of the invention.

FIG. 4C is a flowchart of an exemplary method for building and writing the HTML file. In step 450, the system opens the HTML file and writes a header comprising general purpose HTML tags. In step 452, the date, channel, and time of the program that contained the URL grabbed by the system are written in HTML format to the HTML file.

At this point, in an alternate embodiment, additional information about the program is obtained through steps 462 through 470. In step 462, the system opens a connection to an online TV program information server (TV server) of the type described above, for example, by opening an HTTP connection to a TV information Web server connected to the Internet. In step 464, the system submits a database query to the TV server to request any available TV program information. The query may comprise the channel, date, and time. In step 466, the system receives a response from the TV server containing any available information, such as the program name. In step 467, this additional information is formatted in HTML form and then written to the HTML file in step 470.

In step 454, the grabbed frame is written to the summary file. This may be done by storing a copy of the grabbed frame, full size or in a reduced size, and writing a hyperlink identifying the location of the copy into the summary file. In step 456 the list of URLs associated with the grabbed frame is written to the summary file. In step 458 an image of a Web page associated with each of the URLs is written to the summary file. This can be done by writing an HTML hyperlink in the summary file that identifies the location of a copy of the Web page image. In step 460 the system writes any miscellaneous other HTML tags that are needed for proper formatting, and closes the summary file.

While the preferred embodiment described herein is described with respect to identifying URLs in a video signal, the invention encompasses and is equally applicable to capturing other information from other types of signals. For example, the invention can be used to capture spoken information in a radio signal by substituting appropriate voice recognition equipment for the frame grabber and frame buffer.

Also, while this description has referred to advertisements as an exemplary signal containing information to be captured, the information to be captured can appear in any portion of the video signal, such as a news program, entertainment program, or other program type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of capturing information from a video signal, the method comprising:

providing an element for storing an image from said video signal;

automatically identifying at least one network address contained in said image; and creating a summary document in a markup language, which document includes a representation of the image from the video signal, a list comprising said at least one network address, and a representation of at least one document located at said at least one network address.

2. The method of claim 1 wherein said summary document further includes a representation of general information about the video signal.

* * * * *